(12) United States Patent
Zhang et al.

(10) Patent No.: US 7,903,061 B2
(45) Date of Patent: Mar. 8, 2011

(54) SELF ILLUMINATING ELECTRO WETTING DISPLAY

(75) Inventors: Min-Xian M. Zhang, Inverness, IL (US); Zili Li, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 741 days.

(21) Appl. No.: 11/756,254

(22) Filed: May 31, 2007

(65) Prior Publication Data

US 2008/0297030 A1 Dec. 4, 2008

(51) Int. Cl.
*G09G 3/34* (2006.01)
(52) U.S. Cl. .......................... 345/84; 345/107
(58) Field of Classification Search .............. 345/84, 345/107; 359/265
See application file for complete search history.

(56) References Cited

U.S. PATENT DOCUMENTS

| | | | |
|---|---|---|---|
| 7,569,129 B2* | 8/2009 | Pamula et al. ............... | 204/450 |
| 2005/0151709 A1 | 7/2005 | Jacobson et al. | |
| 2007/0019006 A1* | 1/2007 | Marcu et al. ................. | 345/690 |
| 2007/0075941 A1 | 4/2007 | Zhou et al. | |
| 2007/0097162 A1* | 5/2007 | Iwashita et al. .................. | 347/9 |
| 2008/0074383 A1* | 3/2008 | Dean ............................. | 345/156 |

FOREIGN PATENT DOCUMENTS

| | | |
|---|---|---|
| KR | 10-2006-0646810 B1 | 11/2006 |
| WO | 03048849 A1 | 6/2003 |
| WO | 2006-000945 A1 | 1/2006 |

OTHER PUBLICATIONS

Chang Gyun Kim, "PCT International Search Report and Written Opinion," WIPO, ISA/KR, Oct. 29, 2008.

* cited by examiner

*Primary Examiner* — Kevin M Nguyen

(57) ABSTRACT

A portable electronics device (110, 210) having a self illuminating display (112, 200, 400, 402, 404, 406, 500, 600, 700) that reduces both the thickness of known displays and processing steps in the fabrication thereof is provided. The portable electronic device (110, 210) includes an electrowetting display (112, 200, 400, 402, 404, 406, 500, 600, 700) having a plurality of layers (416, 420; 222, 210; 322, 312; 722, 712) defining a cavity (419) containing a mixture of a first fluid (418, 536, 736) and a second fluid (410, 560, 660, 730) positioned in the cavity (419). First circuitry (424) is configured to be coupled to a first voltage source (422) for selectively repositioning the second fluid (410, 560, 660, 730) in relation to the first fluid (418, 536, 736). A first plurality of electroluminescent particles (408, 560, 660, 760) are positioned within the second fluid (410, 560, 660, 730), and second circuitry (428) is configured to be coupled to a second voltage source (426) for selectively causing the electroluminescent particles (408, 560, 660, 760) to emit photons (430). Additional similar stacks of layers (504, 506, 604, 606) may be added to provide a color display.

16 Claims, 5 Drawing Sheets

-PRIOR ARTns# SELF ILLUMINATING ELECTRO WETTING DISPLAY

FIELD OF THE INVENTION

The present invention generally relates to portable electronic devices and more particularly to a portable electronic device having a self illuminating display.

BACKGROUND OF THE INVENTION

The market for personal portable electronic devices, for example, cell phones, personal digital assistants (PDA's), digital cameras, and music playback devices (MP3), is very competitive. Manufactures are constantly improving their product with each model in an attempt to cut costs and to meet production requirements.

In many portable electronic devices, such as mobile communication devices, displays present information to a user. For example, electrowetting display technology can display video and text information. This low cost reflective display technology comprising electrowetting light valves, may be used to produce stacked black and white, or colored, shutters over a reflective surface. Typical electrowetting devices use a DC voltage to change the wetting properties between a solid and a liquid, thereby moving the colored oil like a shutter in and out of view. Color electrowetting schemes use absorptive oils of Cyan, Magenta, and Yellow for the highest efficiency subtractive approach. The 'open' condition of the shutter is transparent (not black or white) so that the underlying colors are visible when the first color is "off".

These reflective displays are built above a reflective surface that reflects ambient light through the device to illuminate the oil or lack thereof. When ambient light is insufficient, the displays are difficult to see. Conventional liquid crystal displays have included a backlight that provides a white light vertically through the display, through the oil or lack thereof, to be viewed by the user. However, this backlight requires additional layers adjacent each pixel in the display and several additional process steps in the fabrication thereof.

Accordingly, it is desirable to provide a portable electronics device having a self illuminating display that reduces both the thickness of known displays and processing steps in the fabrication thereof. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A portable electronic device having a self illuminating display that reduces both the thickness of known displays and processing steps in the fabrication thereof is provided. The portable electronic device includes an electrowetting display having a plurality of layers defining a cavity containing a combination of a first fluid and a second fluid positioned in the cavity. First circuitry is configured to be coupled to a first voltage source for selectively repositioning the second fluid in relation to the first fluid. A plurality of electroluminescent particles is positioned within the second fluid; and second circuitry configured to be coupled to a second voltage source selectively causes the electroluminescent particles to emit light. Additional similar plurality of layers may be added to provide a color display.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
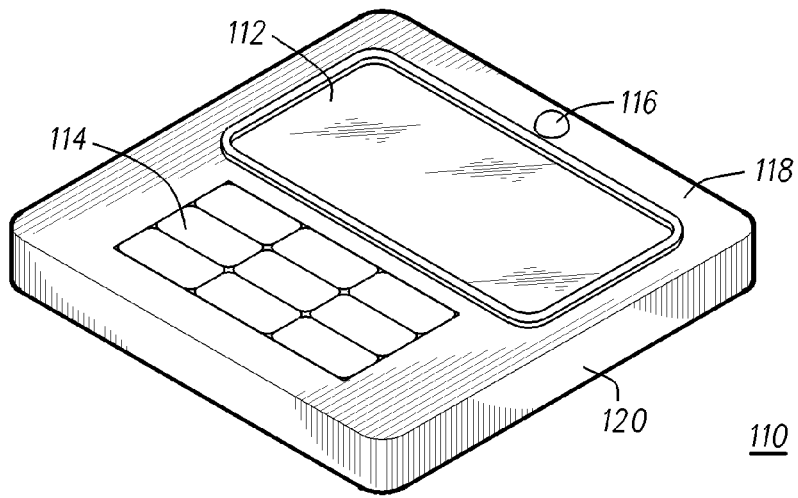
FIG. 1 is a front view of a portable electronic device including a display suitable for use with the exemplary embodiment.

Referring to FIG. 1, a portable electronic device 110 comprises a display 112, a control panel 114, and a speaker 116 encased in a housing 120. Some portable electronic devices 110, e.g., a cell phone, may include other elements such as an antenna, a microphone, and a camera (none shown). In the exemplary embodiments described herein, the display 112 comprises a reflective electrowetting technology. The exemplary embodiment may comprise any type of electronic device, for example, a PDA, a mobile communication device, and gaming devices.

Figure 2:
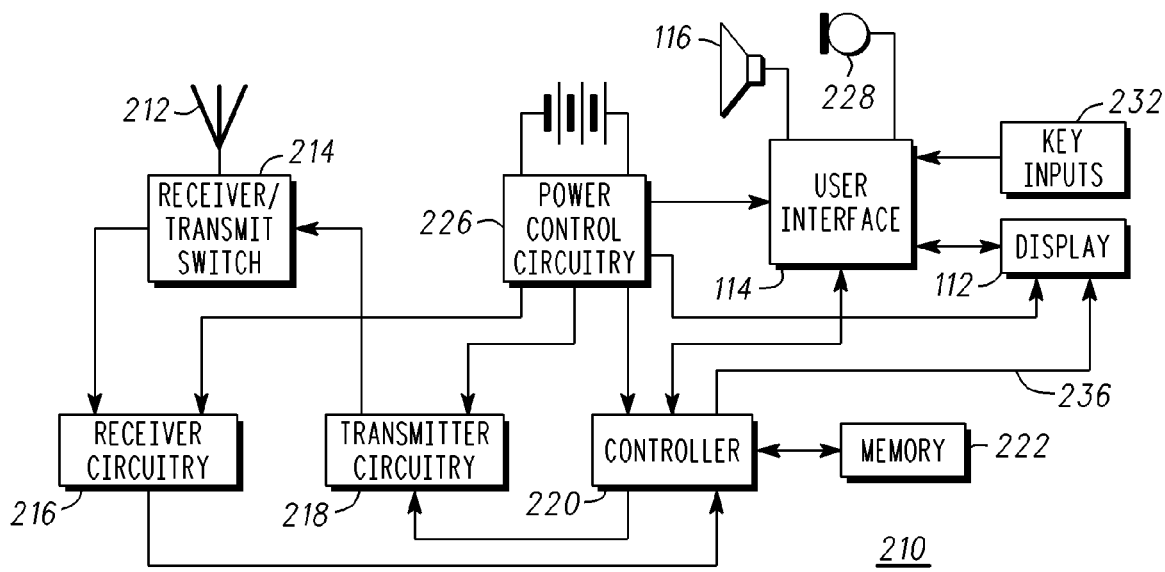
FIG. 2 is a block diagram illustrating circuitry for implementing various exemplary embodiments on the portable electronic device of FIG. 1.

Referring to FIG. 2, a block diagram of a portable electronic device 210 such as a cellular phone, in accordance with the exemplary embodiment is depicted. Though the exemplary embodiment is a cellular phone, the display described herein may be used with any electronic device in which information, colors, or patterns are to be presented. The portable electronic device 210 includes an antenna 212 for receiving and transmitting radio frequency (RF) signals. A receive/transmit switch 214 selectively couples the antenna 212 to receiver circuitry 216 and transmitter circuitry 218 in a manner familiar to those skilled in the art. The receiver circuitry 216 demodulates and decodes the RF signals to derive information therefrom and is coupled to a controller 220 for providing the decoded information thereto for utilization thereby in accordance with the function(s) of the portable communication device 210. The controller 220 also provides information to the transmitter circuitry 218 for encoding and modulating information into RF signals for transmission from the antenna 212. As is well-known in the art, the controller 220 is typically coupled to a memory device 222 and a user interface 114 to perform the functions of the portable electronic device 210. Power control circuitry 226 is coupled to the components of the portable communication device 210, such as the controller 220, the receiver circuitry 216, the transmitter circuitry 218 and/or the user interface 114, to provide appropriate operational voltage and current to those components. The user interface 114 includes a microphone 228, a speaker 116 and one or more key inputs 232, including a keypad. The user interface 114 may also include a display 112 which could include touch screen inputs. The display 112 is coupled to the controller 220 by the conductor 236 for selective application of voltages in some of the exemplary embodiments described below.

The exemplary embodiments described herein may be fabricated using known lithographic processes as follows. The fabrication of integrated circuits, microelectronic devices, micro electro mechanical devices, microfluidic devices, and photonic devices, involves the creation of several layers of materials that interact in some fashion. One or more of these layers may be patterned so various regions of the layer have different electrical or other characteristics, which may be interconnected within the layer or to other layers to create electrical components and circuits. These regions may be created by selectively introducing or removing various materials. The patterns that define such regions are often created by lithographic processes. For example, a layer of photoresist material is applied onto a layer overlying a wafer substrate. A photomask (containing clear and opaque areas) is used to selectively expose this photoresist material by a form of radiation, such as ultraviolet light, electrons, or x-rays. Either the photoresist material exposed to the radiation, or that not exposed to the radiation, is removed by the application of a developer. An etch may then be applied to the layer not protected by the remaining resist, and when the resist is removed, the layer overlying the substrate is patterned. Alternatively, an additive process could also be used, e.g., building a structure using the photoresist as a template.

Though the above described lithography processes are preferred, other fabrication processes may comprise any form of lithography, for example, ink jet printing, photolithography, electron beam lithography, and imprint lithography ink jet printing. In the ink jet printing process, the EL particles are combined in liquid form with the oil and printed in desired locations on the substrate.

A low cost reflective display technology, electrowetting light valves, may be used to produce stacked black and white, or colored, shutters over a reflective surface. Typical electrowetting devices use a low frequency voltage, including DC, to change the wetting properties of a drop of oil in water, thereby moving the colored oil like a shutter in and out of view. Color electrowetting schemes typically use absorptive oils of Cyan, Magenta, and Yellow for the highest efficiency subtractive approach. The 'open' condition of the shutter is transparent (not black or white) so that the underlying colors are visible when the first color is "off".

Figure 3:
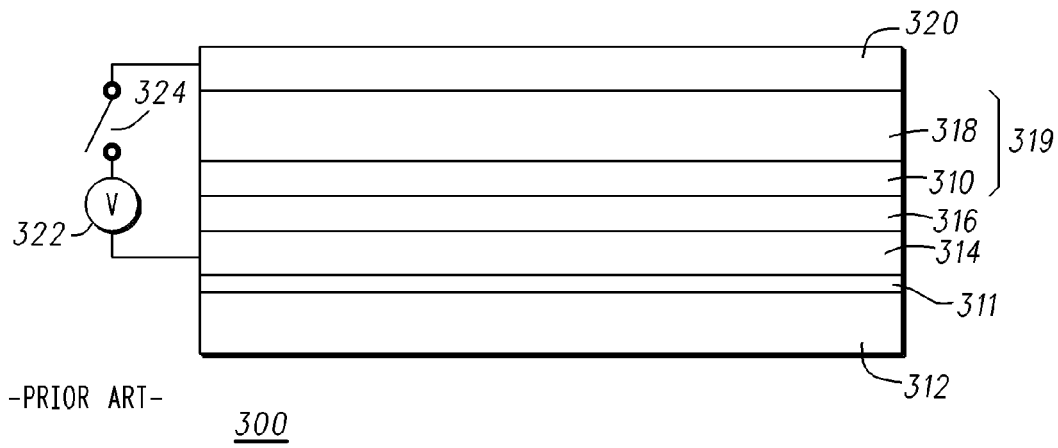
FIG. 3 is a schematic partial cross section illustrating a previously known pixel of an electrowetting display.

FIG. 3 is partial cross section of a known electrowetting display 300 of a single pixel comprising a reflective material 311 deposited on a substrate 312 and a transparent electrode 314 is formed on the reflective material 311. A transparent hydrophobic insulator 316 is formed on the electrode 314 for supporting the combination of oil 310 and water 318. A transparent electrode 320 is formed above and for containing the water 318 and oil 310 in a cavity 319. A DC/low frequency voltage source 322, e.g., DC to 200 hertz, is coupled between the electrodes 314 and 320, and is selectively applied by closing the switch 324. When the switch 324 is closed and a voltage is applied across the conductors 314 and 320, the oil 310 moves to the side (not shown) as is known in the industry by being displaced against the transparent hydrophobic insulator 316 by the water 318.

In operation, without voltage applied, the layer of absorptive oil 310 is located in the optical path, and a color is displayed. By applying a DC, or low frequency, voltage to the layers (typically <40 V), the oil 310 moves to the side of each cell, eliminating the absorption of the light. Incident light then bounces off the reflective surface 311 and back to the viewer. The amount of displacement of the oil is correlated to the applied voltage. Consequently, different shades (greyscales) are obtained by modulating the applied voltage level. The color is maintained by continual application of applied voltage. However, the leakage current is tremendously small, and shades can be maintained for minutes after the voltage source 322 is disconnected. In the illustrated known display, voltage levels are applied to the display 300 once to set the desired color, and then they are re-applied at intervals (for example, 2 minutes), to refresh the charge.

In accordance with the exemplary embodiment, electroluminescent (EL) particles are distributed within the oil. The EL particles preferably comprise a semiconductor compound, for example, a II-VI compound such as zinc sulfide, but may comprise other materials, for example, a dopant such as copper. The EL particles may be mixed in solution with the oil before being placed within the display.

An AC voltage is selectively applied across the oil containing the EL particles, causing the particles to emit light when the AC voltage is applied. In good lighting conditions, the ambient light reflected through the display may be sufficient and the AC voltage need not be applied. However, when ambient lighting is insufficient, the AC voltage may be applied across the oil causing the EL particles to provide sufficient light for viewing the information presented thereon. The electrons in EL particles are excited by the AC voltage and released their energy as photons when combined with holes. This electrowetting technology uses low cost materials and low cost driving methods.

FIGS. 4-7 are schematic diagrams of four states of a single level in which an electrowetting display 400, 402, 404, 406, respectively, includes electroluminescent particles 408 disposed within the oil 410. Each of the FIGS. 4-7 comprise a reflective electrode 414 deposited on a substrate 412. A transparent hydrophobic insulator 416 is formed on the electrode 414 for supporting the combination of oil 410 and water 418. A transparent electrode 420 is formed above and for containing the water 418 and oil 410 in a cavity 419. A first (low frequency or DC) voltage source 422 is coupled between the electrodes 414 and 420, and is selectively applied by closing the first switch 424. A second (AC) voltage source 426, preferably in the range of 400 to 1600 hertz, is coupled between the electrodes 414 and 420 in parallel with the first voltage source 422, and is selectively applied by closing the second switch 426. The low frequency voltage from the first voltage source preferably comprises a frequency of DC to less than 200 hertz and is preferably about 400 hertz less than the voltage from the second voltage source 426.

Figure 4:
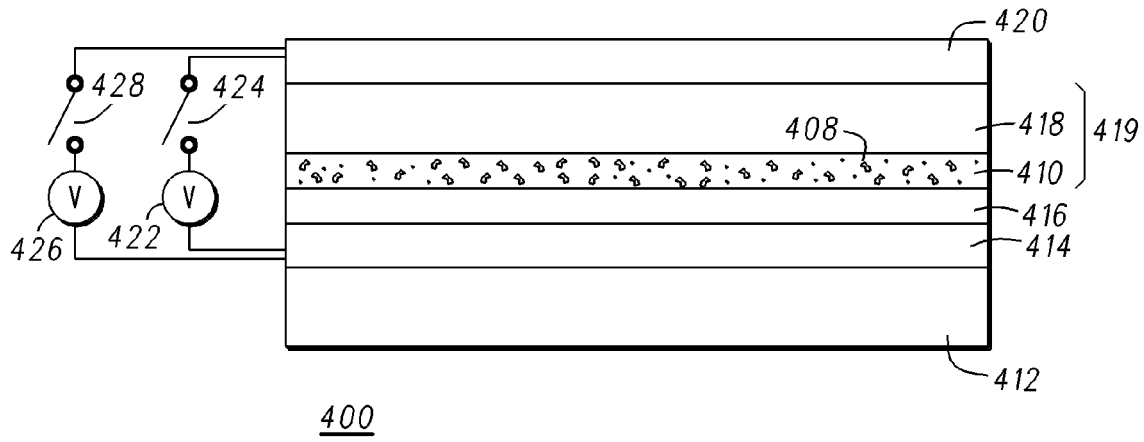
FIGS. 4-7 are schematic partial cross sections illustrating four operational states for an exemplary embodiment.

FIG. 4 shows the switches 424 and 428 open, resulting in the oil being dispersed across the hydrophobic insulator 416 and in the EL particles 408 being non-luminescent. This state is selected to display the color of the oil 410 when ambient conditions are sufficient to provide lighting from the reflective electrode 414.

Figure 5:
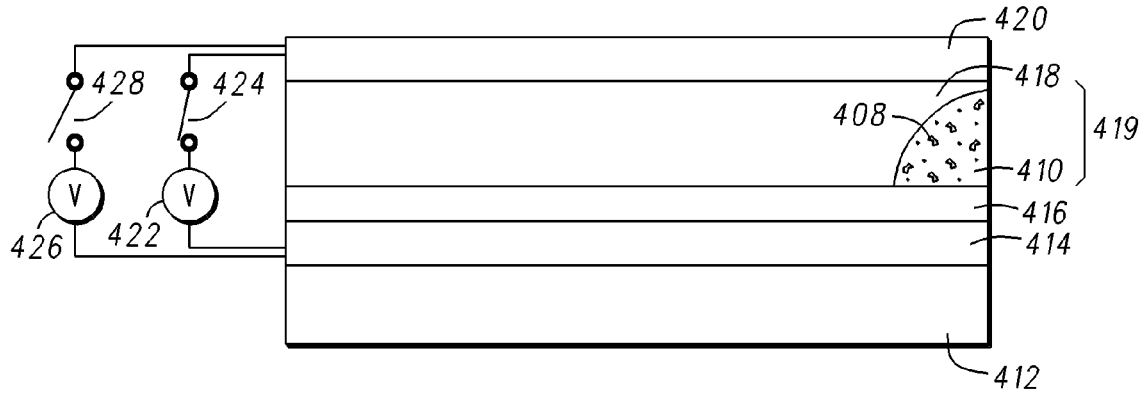

FIG. 5 shows the switch 424 closed and the switch 428 open, resulting in the oil being pulled to the side of the hydrophobic insulator 416 and the EL particles 408 being non-luminescent. This state is selected to not display the color (or white for a non-color display) of the oil 410 when ambient conditions are sufficient to provide lighting from the reflective electrode 414.

Figure 6:
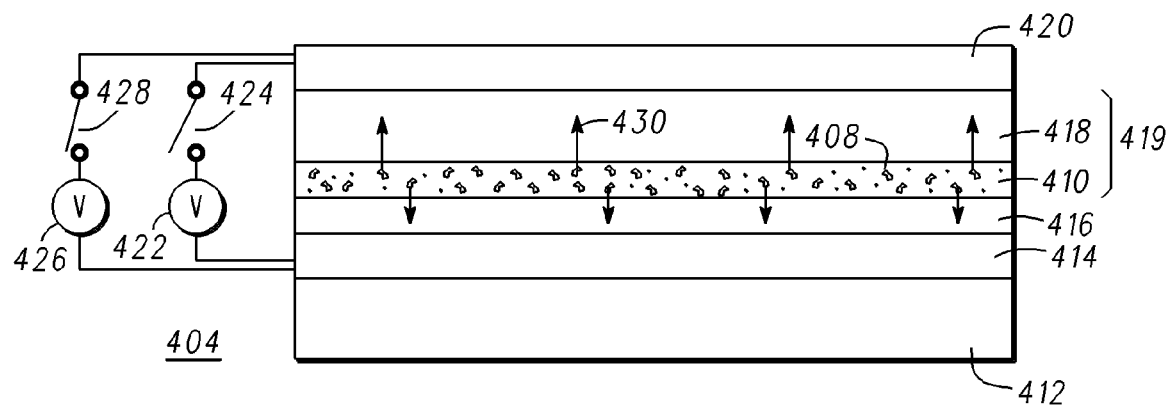

FIG. 6 shows the switch 424 open and the switch 428 closed, resulting in the oil being dispersed across the hydrophobic insulator 416 and the EL particles 408 being luminescent. This state is selected to display the color of the oil 410 when ambient conditions are insufficient to provide lighting from the reflective electrode 414. Photons 430 emitted from the EL particles 408 provide lighting for the display 404.

Figure 7:
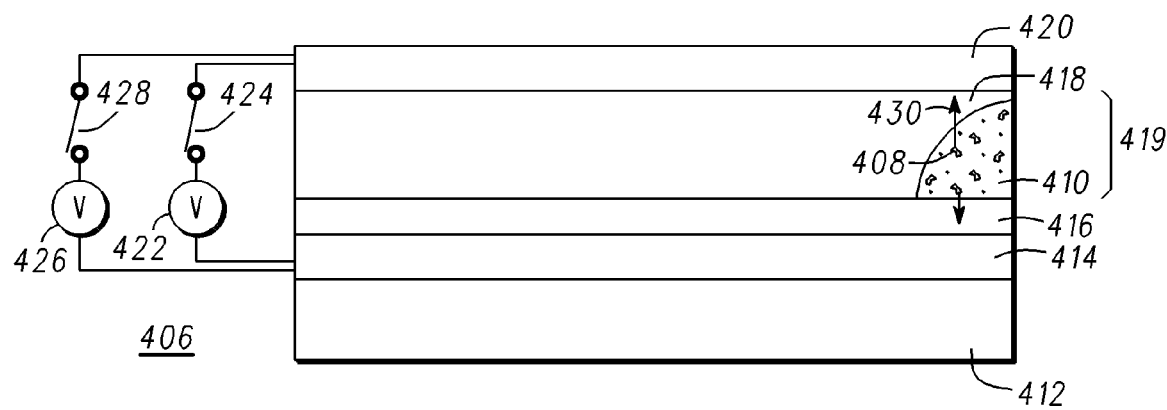

FIG. 7 shows the switches 424 and 428 closed, resulting in the oil 410 being pulled to the side of the hydrophobic insulator 416 and the EL particles 408 being luminescent. This state is selected to display the color shade or grayscale of the oil 410 when ambient conditions are insufficient to provide lighting from the reflective electrode 414. The EL particles 408 provide lighting, photons 430, for the display 404.

The DC or low frequency voltage from the first voltage source 422 may be varied (by replacing switch 424 with a variable switch), resulting in a variable amount of the oil 410 covering the hydrophobic insulator 416, and therefore, resulting of shades of color in a color display or a gray scale in a black and white display.

Colored electrowetting technology, in preferred embodiments, uses a colored shutter (color by absorption rather than reflection), which allows layers to be stacked to form an efficient reflective surface. The "open shutter" transmissivity may exceed 80 to 90% for each tier. Three exemplary embodiments of a color display are described below with reference to FIGS. 8-10.

Figure 8:
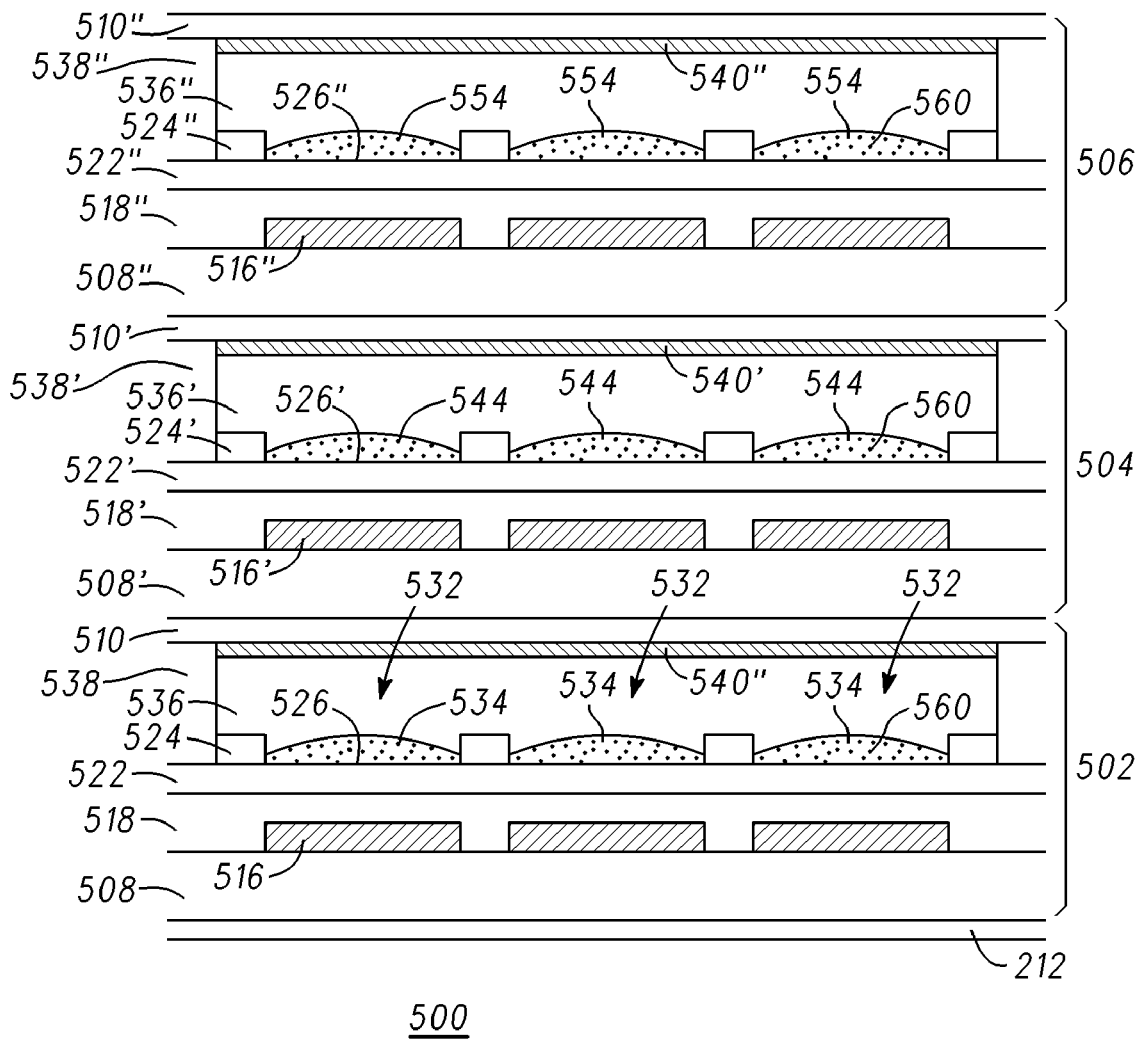
FIG. 8 is a partial cross section of a second exemplary embodiment.

Referring to FIG. 8, a color display 500 comprises three tiers 502, 504, 506. Each tier is an independent color cell, and these tiers 502, 504, 506 are fastened together. One method of fastening is an index-matched optical adhesive. Each tier 502, 504, 506 contains a top substrate 510, 510', 510", respectively, and a bottom substrate 508, 508', 508", respectively. Similar elements are identified with a number in tier 502, a prime of the number in the tier 504, and a double prime in the tier 506. In the preferred embodiment, all six substrate layers 508, 510, 508', 510', 508", 510" are formed of a transparent, sturdy, thin material such as glass, but preferably would comprise a flexible polymer such as polyethylene terephthalate (PET) or polyethylene naphthalate (PEN). A white reflective backplane 512 is positioned at the bottom of the substrate 508. Alternatively, the bottom substrate 508 of tier 502 may be replaced with a compatible white substrate, thereby omitting the bottom layer 512. The tier 502 comprises transparent conductor 516, for example, indium tin oxide (ITO) or poly-3,4-ethylenedioxythiophene (PEDOT), deposited on substrate 508. An optional insulator material 518 is deposited over the conductor 516 and substrate 508. A layer 522 of a hydrophobic (insulator) film is formed on the optional insulator material 518 (or the conductor 516). The layer 522 comprises, for example, fluoropolymers and parylene. A material 524 is patterned on the surface 526 of the layer 522 to establish an operating element size. The pattern of the material 524 preferably forms a grid of ribs which creates an array of cells, 532, but may take any form. Although three cells 532 are shown, it should be understood a large plurality of cells 532 may be fabricated. In a preferred embodiment, the grid is formed from polymethyl methacrylate (PMMA), a photoresist such as epoxy-based SU8 from Microchem, or by hot embossing. A first oil 534 is placed on the surface 526 of the material 524 within the voids 532. The first oil 534 comprises, for example, a mineral oil containing pigments which are soluble in oil, but not water. Example pigments or chromophores are commercially available as dyes, including Cyan, Magenta, and Yellow, at a small weight percent concentration. Another example of pigments or chromophores include lithol rubine (Red), B: copper thalocyanine (Blue), diarylide yellow (Yellow) at 4 weight percent concentration. The rest of the cell is filled with a fluid that does not mix with oil, for example, water. The fluid 536 may contain surfactants and other elements to extend the temperature range of the fluid, aid manufacturing, and improve oil repulsion. The fluid 536 is placed on the first oil 534 and sealed in place by the combination of the seal 538 and the substrate 510. An electrode 540 comprising a transparent conductive material such as indium tin oxide is formed on the substrate 510 for contacting the fluid 536. In another embodiment, this electrode 540 may be patterned, for example, to include bus lines.

The second tier 504 and third tier 506 are fabricated similar to the first tier 502, with like elements represented by the same number, except those in the second tier 504 are identified with a single prime (') and those in the third tier 506 are identified with a double prime ("). A difference in the tiers 502, 504, 506 is that the second tier 504 comprises a second oil 544 and the third tier 506 comprises a third oil 554. Though the color of the oils 534, 544, 554 in the tiers 502, 504, 506 may be in any order, preferably the first, second, and third oils 534, 544, 554 comprise red, blue, and green, or cyan, magenta, and yellow.

Electroluminescent (EL) particles 560 are distributed within the oil 534, 544, and 554. An AC voltage (as described with reference to FIGS. 4-7) is selectively applied across the oil 534, 544, 554 containing the EL particles 560, causing the particles to emit sufficient light for viewing the information presented on the display 500.

For displaying a simple color, an electrical connection is needed for the ground planes in each cell, and for the three color layers. The entire display functions as a single pixel. The display surface may be subdivided into regions with various shapes to permit different areas to display different colors or information. The additional electrical connections require additional interconnects and driving electronics.

In operation, when a desired color and/or pattern (including information such as text) is determined, signals are sent to each tier 502, 504, 506 to move none, one, two, or three of the oils 534, 544, 554. When one of the oils, e.g., 534, is selected to open, the voltage applied across the tier 502 causes the oil to withdraw to a corner of its void 532, allowing light to bypass the oil 534. Therefore, by applying the proper signals to each of the tiers 502, 504, 506, the desired color is achieved.

Without voltage applied, three layers of absorptive oils are located in the optical path, and the display looks black (for the cyna-magenta-yellow subtractive approach). By applying a DC, or a low frequency, voltage to the layers (typically <40 V), the colored oil moves to the side of each cell, eliminating the absorption of specific wavelengths. Incident light then bounces off the backplane and reflect back to the viewer. The amount of displacement of the colored oil is correlated to the applied voltage. Consequently, different shades of colors (greyscales) are obtained by modulating the applied voltage level. The color is maintained by continual application of applied voltage. However, the leakage current is tremendously small, and colors can be maintained for minutes after a voltage source is disconnected. In a preferred embodiment, voltage levels are applied to the display once to set the desired color, and then they are re-applied at intervals (for example, 2 minutes), to refresh the charge.

Figure 9:
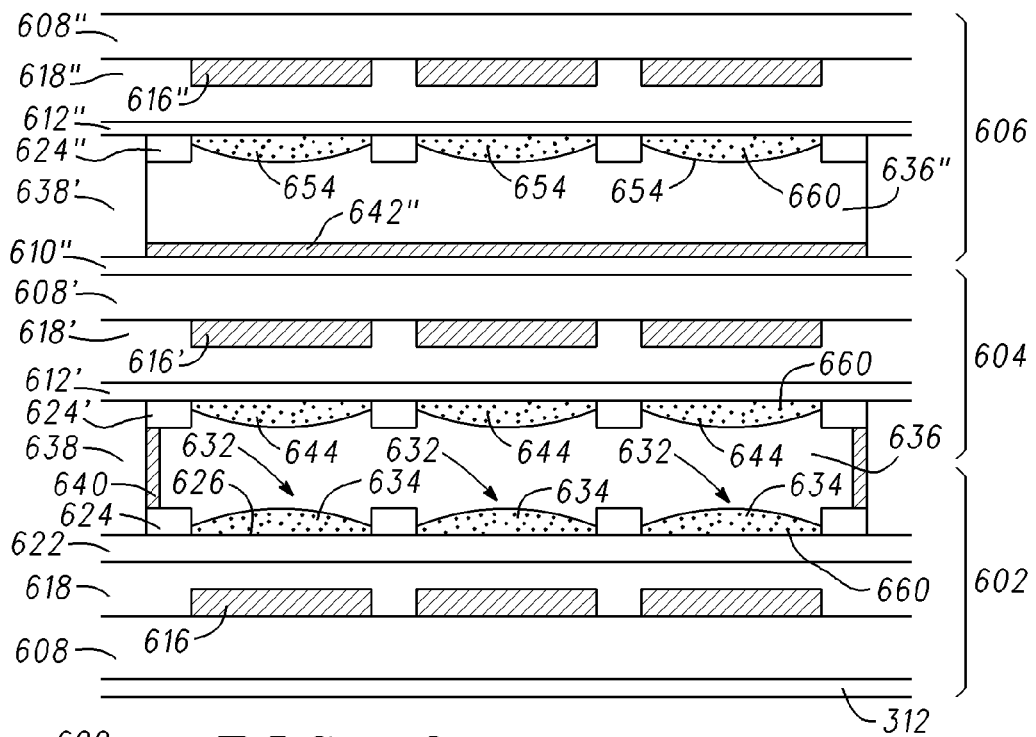
FIG. 9 is a partial cross section of a third exemplary embodiment.

A second exemplary electrowetting technology embodiment of a color display 600 for a portable electronic device 110 is shown in FIG. 9 wherein elements similar to those of FIG. 8 comprise similar material composition. The display 600 comprises three tiers 602, 604, 606, except the second and third tiers 604, 606 are inverted from those of the exemplary embodiment of FIG. 8 to reduce the number of layers, the number of process steps, the overall thickness, and the optical efficiency. The tier 602 is formed between the substrate 608 and the second tier 604, the tier 604 is formed between the tier 602 and the substrate 610', and the tier 606 is formed between the substrate 610' and 610". A white reflective backplane 612 is positioned at the bottom of the substrate 608. Alternatively, the bottom substrate 608 of tier 602 may be replaced with a compatible white substrate, thereby omitting the bottom layer 612. The tier 602 comprises a transparent conductor 616, for example, indium tin oxide (ITO) or poly-3,4-ethylenedioxythiophene (PEDOT), patterned on the substrate 708. An optional insulator material 618 is deposited on the oxide 614 and conductor 616. A layer 622 of a hydrophobic (insulator) film is formed on the optional insulator material 618 (or alternatively on the oxide 614 and conductor 616). A material 624, e.g., a dielectric, is patterned on the surface 626 of the layer 622 to define cells 632. The pattern of the material 624 preferably forms a grid, creating an array of cells 632, but may take any form. A first oil 634 is placed on the surface 626 of the material 624 within the voids 632. The hydrophobic material comprises, for example, SU8 photoresist, that repulses the fluid 636. The fluid 634 is placed on the first oil 634 and sealed in place by the combination of the seal 638 and the substrate 610. An electrode 640 comprising a transparent conductive material such as indium tin oxide is formed on the seal 638 for contacting the fluid 636.

The second tier 604 and third tier 606 are fabricated similar to the first tier 602 but inverted to that of the first tier 602, with like elements represented by the same number, except those in the second tier 604 are identified with a single prime (') and those in the third tier 606 are identified with a double prime ("). A difference in the tiers 602, 604, 606 is that the second tier 604 comprises a second oil 644 and the third tier 606 comprises a third oil 654. Though the color of the oils 634, 644, 654 in the tiers 602, 604, 606 may be in any order, preferably the first, second, and third oils 634, 644, 654, respectively, comprise red, blue, and green, or cyan, magenta, and yellow. An electrode 642" is provided for coupling to the fluid 636".

Electroluminescent (EL) particles 660 are distributed within the oil 634, 644, and 654. An AC voltage (as described with reference to FIGS. 4-7) is selectively applied across the oil 634, 644, 654 containing the EL particles 660, causing the particles to emit sufficient light for viewing the information presented on the display 600. El particles can be selected to have a narrow spectrum range to match the color of the oil or have a wider spectrum range (for example white light) with the color oil filtering out unwanted colors.

For displaying a simple color, an electrical connection is needed for the ground planes in each cell, and for the three color layers. The entire display functions as a single pixel. The display surface may be subdivided into regions with various shapes to permit different areas to display different colors or information. The additional electrical connections require additional interconnects and driving electronics.

In operation, when a desired color and/or pattern (including information such as text) is determined, signals are sent to each tier 602, 604, 606 to move none, one, two, or three of the oils 634, 644, 654. When one of the oils, e.g., 634, is selected to open, the voltage applied across the tier 602 causes the oil to withdraw to a corner of its void 632, allowing light to bypass the oil 634. Therefore, by applying the proper signals to each of the tiers 602, 604, 606, the desired color is achieved.

Without voltage applied, three layers of absorptive oils are located in the optical path, and the display looks black (for the cyna-magenta-yellow subtractive approach). By applying a DC, or a low frequency, voltage to the layers (typically <40 V), the colored oil moves to the side of each cell, eliminating the absorption of specific wavelengths. Incident light then bounces off the backplane and back to the viewer. The amount of displacement of the colored oil is correlated to the applied voltage. Consequently, different shades of colors (greyscales) are obtained by modulating the applied voltage level. The color is maintained by continual application of applied voltage. However, the leakage current is tremendously small, and colors can be maintained for minutes after a voltage source is disconnected. In a preferred embodiment, voltage levels are applied to the display once to set the desired color, and then they are re-applied at intervals (for example, 2 minutes), to refresh the charge.

Figure 10:
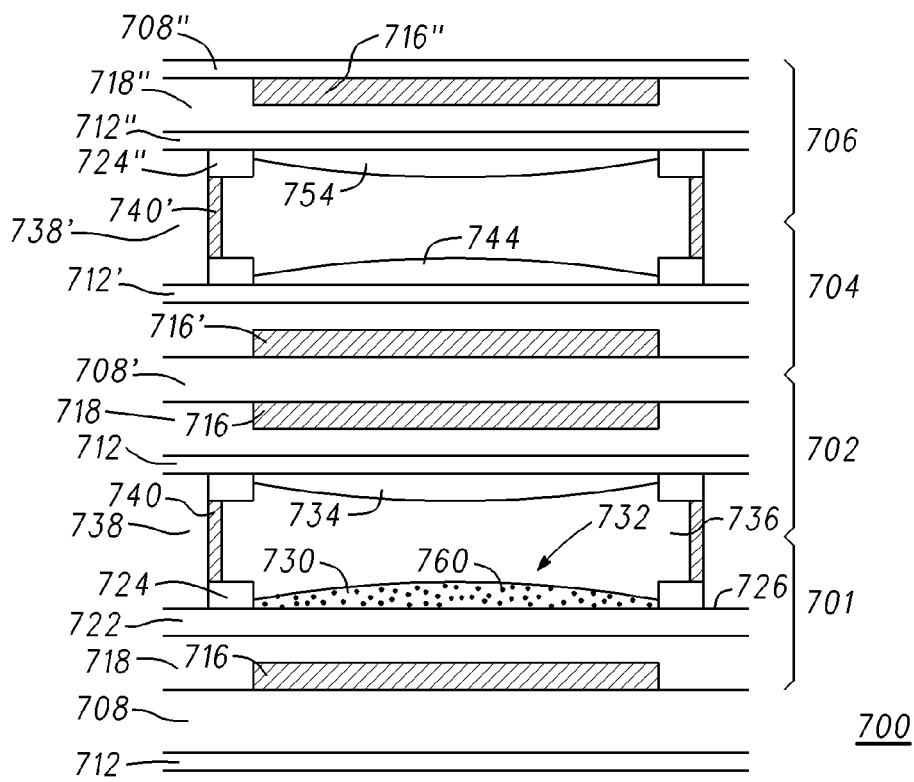
FIG. 10 is a partial cross section of a fourth exemplary embodiment.

FIG. 10 is a third exemplary embodiment of a color display 700 for a portable electronic device 110 wherein elements similar to those of FIG. 9 comprise similar material composition. The display 700 comprises four tiers 701, 702, 704, 706, except the second and third tiers 704, 706 are inverted from those of the exemplary embodiment of FIG. 9. Tiers 701 and 702 may be used for a one color device, and tiers 704 and 706 may be optionally added for a three color device. The tier 701 is formed between the substrate 712 and the second tier 702, the tier 702 is formed between the tier 701 and the third tier 704, the tier 704 is formed between the tier 702 and the fourth tier 706, and the tier 706 is formed between the tier 704 and the substrate 708". A white reflective backplane 712 is positioned at the bottom of the substrate 708. Alternatively, the bottom substrate 708 of tier 701 may be replaced with a compatible white substrate, thereby omitting the bottom layer 712.

The fabrication of the tiers 701, 702, and 704, 706 is similar to the fabrication of the tiers 602, 604 in FIG. 9. The tier 701 comprises a transparent conductor 716, for example, indium tin oxide (ITO) or poly-3,4-ethylenedioxythiophene (PEDOT), patterned on the substrate 708. An optional insulator material (718) is deposited on the oxide 714 and conductor 716. A layer 722 of an insulator film is formed on the optional insulator material (or alternatively on the oxide 714 and conductor 716). A hydrophobic material 724 is patterned on the surface 726 of the layer 722. The pattern of the material 724 preferably forms a grid, creating an array of cells 732, but may take any form. A first oil 730 is placed on the surface 726 of the material 722 within the voids 732 created by the material 724. The hydrophobic material comprises, for example, Teflon® AF2400 solution, that repulses the fluid 736. The fluid 736 is placed on the first oil 730 and sealed in place by the combination of the seal 738 and the second tier 702. An electrode 740 comprising a transparent conductive material such as indium tin oxide is formed on the seal 738 for contacting the fluid 736.

The second, third, and fourth tiers 702, 704, 706 are fabricated similar to the first tier 701, with like elements represented by the same number, except those in the second tier 702 are identified with a single prime ('), those in the third tier 706 are identified with a double prime ("), and those in the fourth tier are identified with a triple prime ('"). The first and second tiers 701, 702, and third and fourth tiers 704, 706, respectively, are fabricated in pairs. A difference in the tiers 701, 702, 704, 706 is that the first tier 701 comprises a first oil containing EL particles 760, the second tier 702 comprises a first color oil 734, the third tier 704 comprises a second color oil 744, and the fourth tier 706 comprises a third color oil 754. Though the color of the oils 734, 744, 754 in the tiers 702, 704, 706 may be in any order, preferably the first, second, and third oils 734, 744, 754, respectively, comprise red, blue, and green, or cyan, magenta, and yellow.

Electroluminescent (EL) particles 760 are distributed within the oil 730. An AC voltage is selectively applied (as described with reference to FIGS. 4-7) across the oil 730 containing the EL particles 760, causing the particles to emit light sufficient light for viewing the information presented on the display 700.

For displaying a simple color, an electrical connection is needed for the ground planes in each cell, and for the three color layers. The entire display functions as a single pixel. The display surface may be subdivided into regions with various shapes to permit different areas to display different colors or information. The additional electrical connections require additional interconnects and driving electronics.

In operation, when a desired color and/or pattern (including information such as text) is determined, signals are sent to each tier 702, 704, 706 to move none, one, two, or three of the oils 734, 744, 754. When one of the oils, e.g., 734, is selected to open, the voltage applied across the tier 702 causes the oil to withdraw to a corner of its void 732, allowing light to bypass the oil 734. Therefore, by applying the proper signals to each of the tiers 702, 704, 706, the desired color is achieved.

Without voltage applied, three layers of absorptive oils are located in the optical path, and the display looks black (for the cyna-magenta-yellow subtractive approach). By applying a DC, or a low frequency, voltage to the layers (typically <40 V), the colored oil moves to the side of each cell, eliminating the absorption of specific wavelengths. Incident light then bounces off the backplane and back to the viewer. The amount of displacement of the colored oil is correlated to the applied voltage. Consequently, different shades of colors (greyscales) are obtained by modulating the applied voltage level. The color is maintained by continual application of applied voltage. However, the leakage current is tremendously small, and colors can be maintained for minutes after a voltage source is disconnected. In a preferred embodiment, voltage levels are applied to the display once to set the desired color, and then they are re-applied at intervals (for example, 2 minutes), to refresh the charge.

In any of the embodiments, including the exemplary embodiments described herein, the EL particles 408, 560, 660, 760 may be fabricated to emit light at a desired frequency, thereby imparting a desired color. El particles 408, 560, 660, 760 are fabricated from, for example, a II-IV semiconductor compound having direct band gaps for efficient electroluminescence. The bank gap can be shifted by the presence of impurities or dopants. The selection of dopant in the compound will permit the EL to emit light with a specific color or a white light. This color emitted from the EL particles results in that color being emitted from single cell displays such as shown in FIGS. 4-7. This color emitted from the EL particles may be combined with the colored light provided by the multiple stacked layers such as shown in FIGS. 8-10.

Additionally, quantum dots may be used instead of the EL particles. Quantum dots emit photons having a frequency depending on the material selected for, and the size of, the quantum dot. Quantum dots comprise an inorganic nanocrystal material, for example, PbSe, CdSe, (CdSe)ZnS, Au, having a diameter, for example, in the range of 3-10 nanometers. Quantum dots may be excited by the application of the AC voltage described herein. This color emitted from the quantum dots results in that color being emitted from single cell displays such as shown in FIGS. 4-7 when the oil color is clear. This color emitted from the quantum dots may be combined with the colored light provided by the multiple stacked layers such as shown in FIGS. 8-10.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. An electrowetting display, comprising:
   a plurality of layers defining a cavity;
   a combination of a first fluid and a second fluid positioned in the cavity;
   first circuitry configured to be coupled to a first voltage source for selectively repositioning the second fluid in relation to the first fluid;
   a first plurality of particles positioned within the second fluid; and
   second circuitry configured to be coupled to a second voltage source for selectively causing the particles to emit photons.

2. The electrowetting display of claim 1 wherein the particles comprise a first plurality of electroluminescent particles.

3. The electrowetting display of claim 2 wherein the plurality of layers comprise:
   a first conductive layer;
   a first transparent hydrophobic material formed over the first conductive layer;
   a first transparent material formed over the first transparent hydrophobic material to define the first cavity; and
   a first transparent conductor formed on the first transparent material;
   wherein the first voltage source is selectively coupled between the first conductive layer and the first transparent conductor, and the second voltage source is selectively coupled between the first conductive layer and the first transparent conductor.

4. The electrowetting display of claim 3 further comprising a reflective layer disposed contiguous to the first conductive layer.

5. The electrowetting display of claim 3 wherein the first conductive layer comprises a reflective layer.

6. The electrowetting display of claim 2 wherein the first fluid has a disaffinity for the first transparent hydrophobic material and the second fluid comprises a first oil.

7. The electrowetting display of claim 2 further comprising electronics coupled to select the first and second circuitry.

8. The electrowetting display of claim 7 wherein the electronics comprises a cellular telephone.

9. The electrowetting display of claim 1 wherein the first voltage comprises one of a DC voltage source and a voltage source having a frequency less than 200 hertz.

10. The electrowetting display of claim 1 wherein the second voltage comprises an AC voltage source.

11. A method comprising:
    selectively applying a first voltage between first and second electrodes of an electrowetting display to reposition a first material in combination with a second material, the combination positioned between the first and second electrodes so as to alter the amount of light passing therethrough; and
    selectively applying a second voltage between the first and second electrodes to cause a first plurality of particles in solution with the first material to emit photons.

12. The method of claim 11 wherein the first material imparts a color to the light and applying the first voltage at least partially removes the colored light from the display.

13. The method of claim 11 wherein the photons are absorbed within the first material and other photons having a different frequency are emitted therefrom.

14. The method of claim 11 wherein the first material is oil and the second material is water.

15. The method of claim 11 wherein the particles comprise a first plurality of electroluminescent particles, the method further comprising:

selectively applying the first voltage between third and fourth electrodes of an electrowetting display to reposition a third material in combination with the second material positioned between the third and fourth electrodes so as to alter the amount of light passing therethrough;

selectively applying the AC voltage between the third and fourth electrodes to cause a second plurality of electroluminescent particles in solution with the third material to emit photons;

selectively applying the first voltage between fifth and sixth electrodes of an electrowetting display to reposition a fourth material in mixture with the second material positioned between the fifth and sixth electrodes so as to alter the amount of light passing therethrough; and selectively applying the second voltage between the fifth and sixth electrodes to cause electroluminescent particles in solution with the fourth material to emit photons.

16. The method of claim 15 wherein the first, third, and fourth material is oil and the second material is water.

* * * * *